United States Patent
Dristy et al.

(10) Patent No.: US 6,811,915 B2
(45) Date of Patent: Nov. 2, 2004

(54) CELL FRAME/FLOW FIELD INTEGRATION METHOD AND APPARATUS

(75) Inventors: Mark E. Dristy, Kutztown, PA (US); Greg A. Hanlon, East Hampton, CT (US)

(73) Assignee: Proton Energy Systems, Inc., Rocky Hill, CT (US)

(*) Notice: Subject to any disclaimer, the term of this patent is extended or adjusted under 35 U.S.C. 154(b) by 400 days.

(21) Appl. No.: 09/967,465

(22) Filed: Sep. 28, 2001

(65) Prior Publication Data

US 2002/0068208 A1 Jun. 6, 2002

Related U.S. Application Data

(60) Provisional application No. 60/307,036, filed on Jul. 20, 2001, and provisional application No. 60/236,279, filed on Sep. 28, 2000.

(51) Int. Cl.[7] .............................................. H01M 2/08
(52) U.S. Cl. ............................ 429/35; 429/34; 429/36; 429/38; 429/39
(58) Field of Search .............................. 429/34, 38, 39, 429/35, 36, 44

(56) References Cited

U.S. PATENT DOCUMENTS

| | | | |
|---|---|---|---|
| 5,176,966 A | 1/1993 | Epp et al. | 429/26 |
| 5,523,175 A | 6/1996 | Beal et al. | 429/30 |
| 5,698,337 A | 12/1997 | Nitschke et al. | 429/35 |
| 5,858,569 A | 1/1999 | Meacher et al. | 429/26 |
| 5,928,807 A | 7/1999 | Elias | 429/35 |
| 5,976,726 A | 11/1999 | Wilkinson et al. | 429/35 |
| 6,057,054 A | 5/2000 | Barton et al. | 429/42 |
| 6,117,287 A | 9/2000 | Molter et al. | 204/255 |
| 6,171,719 B1 * | 1/2001 | Roy et al. | 429/39 |
| 6,602,631 B1 * | 8/2003 | Cisar et al. | 429/34 |
| 2001/0008722 A1 | 7/2001 | Speranza et al. | 429/44 |

FOREIGN PATENT DOCUMENTS

DE 19821767 C2 11/1999

OTHER PUBLICATIONS

International Search Report; International Publication No. WO 02/027847 A3; International Publication Date Apr. 4, 2002; 5 pages.

* cited by examiner

*Primary Examiner*—Bruce F. Bell
(74) *Attorney, Agent, or Firm*—Cantor Colburn LLP

(57) ABSTRACT

An electrochemical cell in which the cell frame is integrated with the flow field support member defining a contiguous surface includes an electrode, a proton exchange membrane and a flow field support member disposed at the electrode, a cell frame disposed at the flow field support member, and a membrane support element disposed intermediate the flow field support member and the frame. A resilient seal may be disposed at the cell frame. A method of integrating the frame with the flow field support member includes disposing the membrane support element in a gap between the frame and the flow field support member and melting the membrane support element into the frame and the flow field support member to form a contiguous surface. A method of sealing a flow field of the cell includes disposing a resilient seal at the cell frame.

16 Claims, 3 Drawing Sheets

CELL FRAME/FLOW FIELD INTEGRATION METHOD AND APPARATUS

CROSS REFERENCE TO RELATED APPLICATIONS

This application claims the benefits of U.S. Provisional Patent Application Ser. No. 60/236,279, filed Sep. 28, 2000, and U.S. Provisional Patent Application Ser. No. 60/307,036 filed Jul. 20, 2001, the entire contents of both applications being incorporated herein by reference.

BACKGROUND

This disclosure relates to electrochemical cells, and, more particularly, to an apparatus and methods for improving cell operation.

Electrochemical cells are energy conversion devices that are usually classified as either electrolysis cells or fuel cells. Proton exchange membrane electrolysis cells can function as hydrogen generators by electrolytically decomposing water to produce hydrogen and oxygen gases. Referring to FIG. 1, a section of an anode feed electrolysis cell of the related art is shown at 10 and is hereinafter referred to as "cell 10." Reactant water 12 is fed to cell 10 at an oxygen electrode (e.g., an anode) 14 where a chemical reaction occurs to form oxygen gas 16, electrons, and hydrogen ions (protons). The chemical reaction is facilitated by the positive terminal of a power source 18 connected to anode 14 and a negative terminal of power source 18 connected to a hydrogen electrode (e.g., a cathode) 20. Oxygen gas 16 and a first portion 22 of the water are discharged from cell 10, while the protons and a second portion 24 of the water migrate across a proton exchange membrane 26 to cathode 20. At cathode 20, hydrogen gas 28 is formed and is removed for use as a fuel or a process gas. Second portion 24 of water, which is entrained with hydrogen gas, is also removed from cathode 20.

Another type of water electrolysis cell that utilizes the same configuration as is shown in FIG. 1 is a cathode feed cell. In the cathode feed cell, process water is fed on the side of the hydrogen electrode. A portion of the water migrates from the cathode across the membrane to the anode. A power source connected across the anode and the cathode facilitates a chemical reaction that generates hydrogen ions and oxygen gas. Excess process water exits the cell at the cathode side without passing through the membrane.

A typical fuel cell also utilizes the same general configuration as is shown in FIG. 1. Hydrogen gas is introduced to the hydrogen electrode (the anode in the fuel cell), while oxygen, or an oxygen-containing gas such as air, is introduced to the oxygen electrode (the cathode in the fuel cell). The hydrogen gas for fuel cell operation can originate from a pure hydrogen source, a hydrocarbon, methanol, an electrolysis cell, or any other source that supplies hydrogen at a purity level suitable for fuel cell operation. Hydrogen gas electrochemically reacts at the anode to produce protons and electrons, the electrons flow from the anode through an electrically connected external load, and the protons migrate through the membrane to the cathode. At the cathode, the protons and electrons react with oxygen to form water.

Conventional electrochemical cell systems generally include one or more individual cells arranged in a stack, with the working fluids directed through the cells via input and output conduits formed within the stack structure. The cells within the stack are sequentially arranged, each including a membrane electrode assembly (hereinafter "MEA") defined by the cathode, the proton exchange membrane, and the anode. Each cell typically further comprises a first flow field in fluid communication with the cathode and a second flow field in fluid communication with the anode. The MEA may be supported on either or both sides by flow field support members such as screen packs or bipolar plates disposed within the flow fields, and which may be configured to facilitate membrane hydration and/or fluid movement to and from the MEA. Because a differential pressure often exists across the MEA during operation of the cell, pressure pads or other compression means are employed to maintain uniform compression of the cell components, thereby maintaining intimate contact between flow fields and cell electrodes over long time periods.

Referring now to FIG. 2, a conventional electrochemical cell system illustrating the spatial relationship between the active area (defined by the electrodes and the space therebetween) and cell frames is shown at 20. In cell system 20, the MEA 22 is typically supported by the flow field support members 24 and clamped between cell frames 26. Limitations inherent in the precision manufacture of flow field support members 24 and cell frames 26 result in the presence of a first gap 30 of dimension $l_1$ between a peripheral outer surface of flow field support member 24 and an inner boundary surface of cell frame 26 during the assembly of the cell. When the cell is fully assembled and MEA 22 is supported within cell frames 26, the pressure differential is such that the pressure on one side of MEA 22 is higher than the pressure on the other side of MEA 22. During operation of the cell, MEA 22 must be capable of supporting this pressure differential. First gap 30 between cell frame 26 and flow field support member 24 oftentimes exceeds a width beyond which MEA 22 can span and support the pressure differential without deforming. Deforming of MEA 22 may result in a compromise of the structural integrity of cell system 20.

One manner of accommodating the presence of first gap 30 and the problems associated with pressure differentials involves incorporating a thin metal or polymer protector ring 32 into the electrochemical cell. Protector ring 32 supports the pressure load imposed on MEA 22 over first gap 30. At high cell operating pressures, however, internal cell dynamics associated with repeated pressure cycles may cause relative motion between cell components, which may dislocate protector ring 32 even after successful cell assembly and cause the presence of a second gap 34 of dimension $l_2$ between protector ring 32 and cell frame 26. The dislocation of protector ring 32 may result in the exposure of MEA 22 to gaps 30, 34, which may cause less than optimum performance of the cell to be realized.

The maintaining of compression within the cell and the containment of the various electrochemical reactants and by-products generated in the cell is achieved by the use of thin, non-resilient gaskets, which are typically fabricated from polytetrafluoroethylene. When placed under the clamping loads encountered within the electrochemical cell, these non-resilient gaskets creep or deform to fill any imperfections in the surfaces of the components that they are intended to seal. The internal pressures that are effectively contained using such clamping methods may be considerably less than the pressure load exerted on the gaskets prior to any internal pressure being generated. As a result, the containment of high pressures using the non-resilient gasket approach requires very high clamping loads, which may, over the lifetime of the cell, become impractical. Furthermore, since such gaskets are non-resilient, they are ineffective at accommodating any creep that may occur as a result of a lessening of the clamping load. As such, they are likely to develop leaks over time as creep effects cause the clamping load to be relaxed. Moreover, the non-resilient gaskets may require a time consuming creep-inducing "heat soak" procedure to initiate the sealing of components.

While existing protector rings and gaskets are suitable for their intended purposes, there still remains a need for an improved apparatus and method of maintaining the compression of the cell and of protecting the MEA, particularly regarding the bridging of the gap between the flow field support member and the cell frame and the retaining of the protector ring thereacross during both assembly and operation of the cell. Therefore, a need exists for an integrally structured cell frame/flow field support member that allows cell compression to be maintained while protecting and supporting the MEA.

SUMMARY

The above-described drawbacks and disadvantages are alleviated by an electrochemical cell system in which a cell frame is integrated with a flow field support member. The cell system includes an electrode, a proton exchange membrane and the flow field support member disposed at the electrode to support the electrode, the cell frame disposed at the flow field support member, and a membrane support element integrally formed with the flow field support member and the cell frame. The integration of the flow field support member and the cell frame defines a contiguous surface extending from and including the flow field support member and the cell frame. A resilient seal may also be disposed at the cell frame, the resilient seal being configured to inhibit fluid communication along an interface of the cell frame and the engaging surface of the cell component. A method of integrating the cell frame with the flow field support member includes disposing the membrane support element in a gap between the cell frame and the flow field support member and melting the membrane support element into the cell frame and the flow field support member to form a contiguous surface. A method of sealing a flow field of an electrochemical cell includes disposing a resilient seal at a cell frame of the electrochemical cell system.

BRIEF DESCRIPTION OF THE DRAWINGS

Referring now to the drawings, which are meant to be exemplary and not limiting, and wherein like elements are numbered alike in the several FIGURES.

DETAILED DESCRIPTION

Disclosed herein is a novel apparatus and methods for maintaining the continuity of the various components in the active area in an electrochemical cell system. The active area, as stated above, generally refers to the electrically associated electrodes and the space between two or more electrically associated electrodes of the cell. A membrane support element, e.g. an integratable gasket as is described below, is disposed at the juncture of a supporting frame and a flow field of the cell system to maintain cell compression by minimizing separation of the cell components under pressure. The membrane support element also supports the MEA and inhibits its deformation during assembly and operation of the system. Resilient seals are also disposed intermediate the frame and the adjacent cell structure to assist in maintaining the cell compression and to prevent fluid communication between an inner area defined by the cell system boundary and the area outside the cell system.

Although the disclosure below is described in relation to a proton exchange membrane electrochemical cell employing hydrogen, oxygen, and water, other types of electrochemical cells and/or electrolytes may be used, including, but not limited to, phosphoric acid and the like. Various reactants can also be used, including, but not limited to, hydrogen, bromine, oxygen, air, chlorine, and iodine. Upon the application of different reactants and/or different electrolytes, the flows and reactions change accordingly, as is commonly understood in relation to that particular type of electrochemical cell. Furthermore, while the discussion below is directed to an anode feed electrolysis cell, it should be understood by those of skill in the art that cathode feed electrolysis cells, fuel cells, and regenerative fuel cells (combinations of electrolysis and fuel cells) are also within the scope of the embodiments disclosed.

Figure 3:
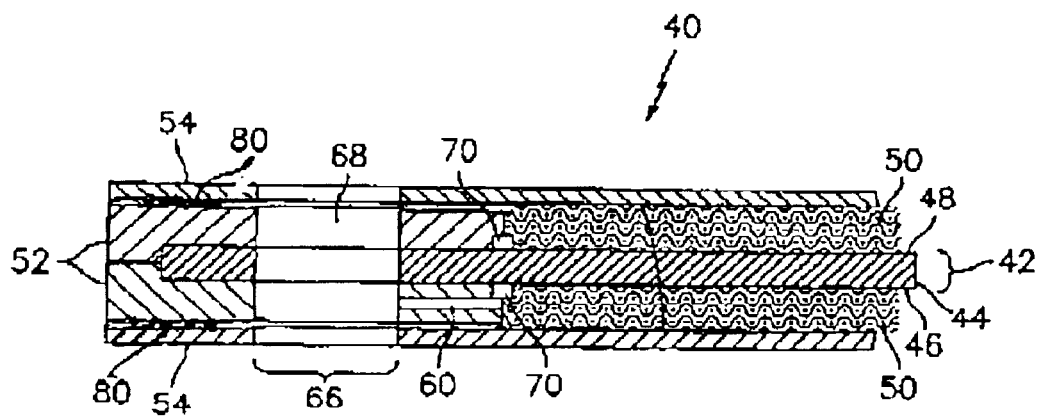
FIG. 3 is a cross sectional view from line 3—3 of the electrochemical cell of FIG. 7.

Referring to FIG. 3, an electrochemical cell system incorporating an exemplary embodiment of the membrane support element is shown generally at 40. Cell system 40 typically includes a plurality of cells employed in a stack as part of the cell system. When cell system 40 is utilized as an electrolysis cell, power inputs are generally from about 1.48 volts to about 3.0 volts, with current densities being about 50 A/ft$^2$ (amperes per square foot) to about 4,000 A/ft$^2$. When utilized as a fuel cell, power outputs range from about 0.4 volts to about 1 volt, with current densities being from about 0.1 A/ft$^2$ to about 10,000 A/ft$^2$. Current densities exceeding 10,000 A/ft$^2$ may also be obtained depending upon the fuel cell dimensions and configuration. The number of cells within the stack and the dimensions of the individual cells is scalable to the cell power output and/or gas output requirements.

Figure 1:
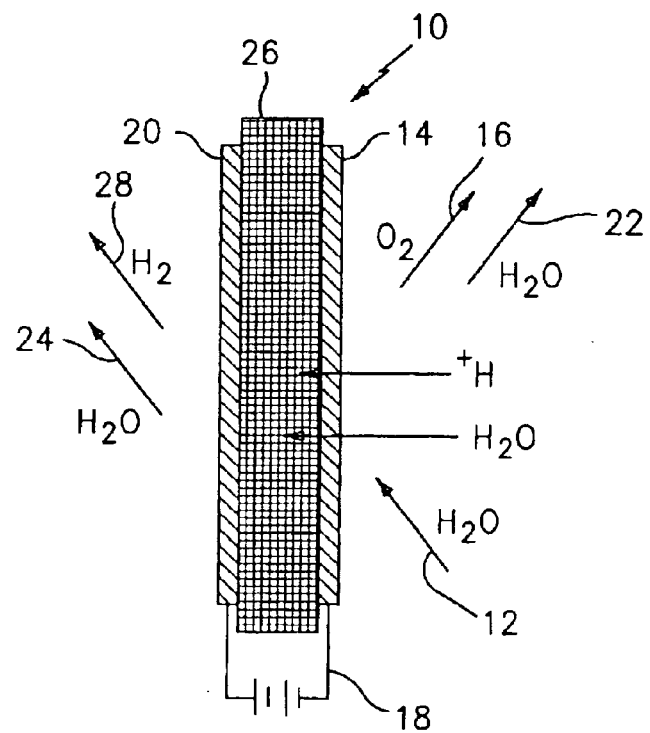
FIG. 1 is a schematic representation of a conventional anode feed electrolysis cell.
Figure 2:
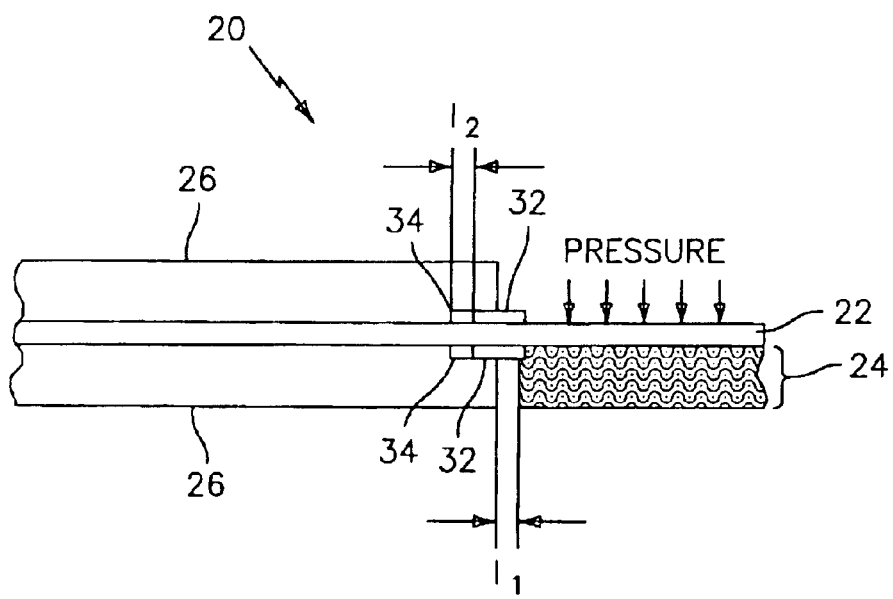
FIG. 2 is a cross sectional view of a conventional electrochemical cell showing the spatial relationship of the cell components.
Figure 4:
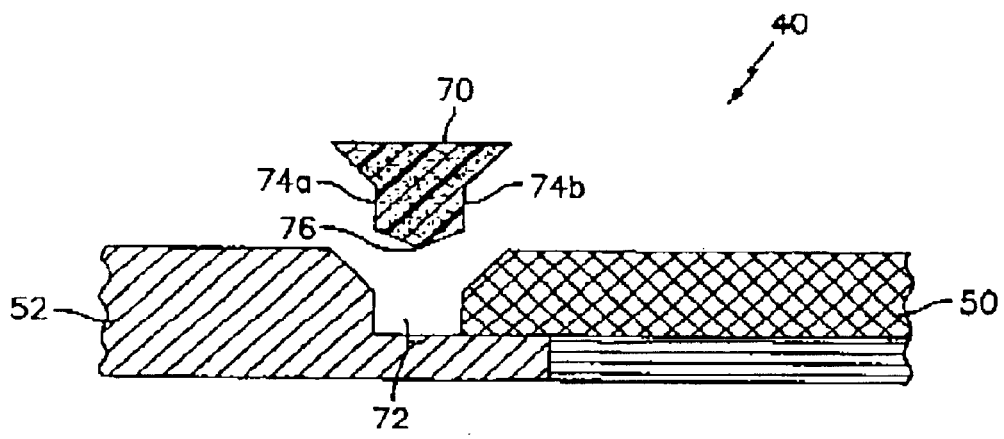
FIG. 4 is a cross sectional view of the insertion of the membrane support element between a cell frame and a flow field support member.
Figure 5:
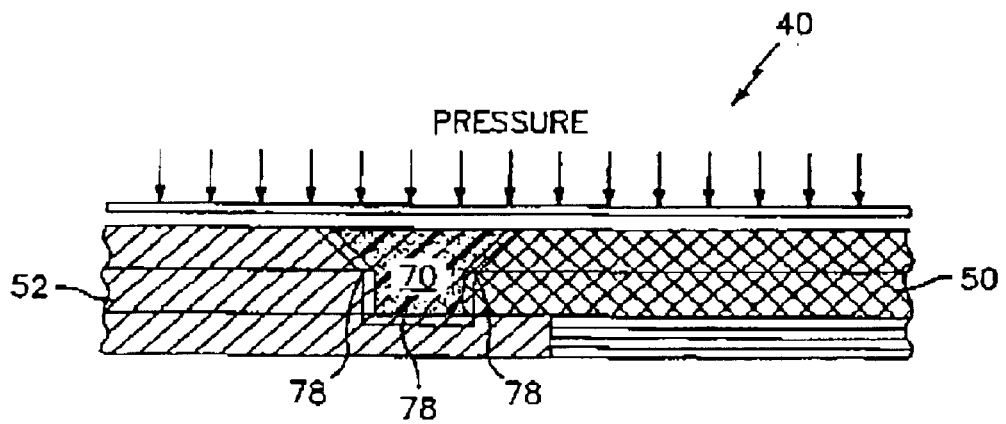
FIG. 5 is a cross sectional view of the membrane support element and gradual transitions between the cell frame and the flow field support member.

Cell system 40 is substantially similar to cell system 20 as described above and shown with reference to FIG. 2. In particular, cell system 40 comprises an MEA 42 defined by a proton exchange membrane 44 having a first electrode (e.g., an anode) 46 and a second electrode (e.g., a cathode) 48 disposed on opposing sides thereof. Regions proximate to and bounded on at least one side by anode 46 and cathode 48 define flow fields immediately adjacent anode 46 and cathode 48. Flow field support members 50 may be disposed at the flow fields and retained therein by frames 52 and cell separator plates 54. The membrane support elements, shown at 70 and described below with reference to FIGS. 4 and 5, are disposed between flow field support members 50 and frames 52. Resilient seals 80 (described below with reference to FIGS. 6 and 7) are positioned between frames 52 and cell separator plates 54 to seal the flow fields and to inhibit fugitive fluid emissions from the cell. The cell components, particularly frames 52, cell separator plates 54, and gaskets 56, are formed with the suitable manifolds or other conduits to facilitate fluid communication through cell system 40.

The operation of cell system 40 is initiated by the receiving of process water into an inlet port 66 at the oxygen side of the cell structure. Inlet port 66 forms the mouth of a conduit 68 defined by axially aligned openings in the assembly of frames 52. A portion of the process water is diverted through a channel 60 extending from conduit 68 to the flow field to provide fluid communication between conduit 68 and the flow field at anode 46. Process water not diverted into channel 60 flows through conduit 68 such that portions thereof are received in the channels of cells (not shown) subsequently encountered by the process water to provide fluid communication between conduit 68 and the flow fields associated with the subsequently encountered cells. The portion of the process water diverted into the flow field diffuses through the flow fields (via flow field support members 50) where the water molecules are electrochemically converted into oxygen gas and protons. The oxygen gas and an excess portion of the process water are exhausted from the cell through various porting arrangements (not shown). The generation of gases within the structure of the cell produces a pressure differential across the two flow fields of each cell. Such a pressure differential biases MEA 42 against one of flow field support members 50. The direction of the pressure drop is dependent upon the application requirements of the electrochemical system into which the cell is incorporated.

Both cell frames 52 and flow field support members 50 may support MEA 42, wherein anode 46 and cathode 48 are disposed in intimate contact with proton exchange membrane 44. Membrane 44 comprises electrolytes that are preferably solids or gels under the operating conditions of the electrochemical cell. Useful materials from which membrane 44 may be fabricated include proton conducting ionomers and ion exchange resins. Useful proton conducting ionomers include complexes comprising an alkali metal salt, an alkali earth metal salt, a protonic acid, or a protonic acid salt. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid, are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins can include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids, and bases. One family of fluorocarbon-type resins having sulfonic acid group functionality is NAFION™ resins (commercially available from E.I. du Pont de Nemours and Company, Wilmington, Del.).

Anode 46 and cathode 48 are fabricated from catalyst materials suitable for performing the needed electrochemical reaction (i.e., electrolyzing water to produce hydrogen and oxygen). Suitable materials for anode 46 and cathode 48 include, but are not limited to, platinum, palladium, rhodium, carbon, gold, tantalum, tungsten, ruthenium, iridium, osmium, alloys thereof, and the like. Anode 46 and cathode 48 are generally provided in plate-form, wherein they are disposed at membrane 44 by conventional methods (e.g., by being pressed or laminated or the like onto membrane 44). Alternatively, the electrodes can be formed directly onto membrane 44 (e.g., by being sprayed, dipped, painted, or the like), or they can be disposed at membrane 44 in a form that is miscible with the proton exchange material (e.g., by being vapor deposited). Preferably, the proton exchange membrane and the electrodes are formed in-situ by applying the electrode catalyst and proton exchange material to a substrate or membrane support (not shown).

Frames 52 can be formed of any dielectric material that is compatible with the electrochemical cell environment and is capable of providing support for MEA 42. Possible frame materials include, but are not limited to, thermoset, thermoplastic, and rubber materials, such as polyetherimide, polysulfone, polyethersulfone, and polyarylether ketone (PEEK), VITON® (commercially available from E.I. duPont de Nemours and Company, Wilmington, Del.), ethylenepropylenediene monomer, ethylenepropylene rubber, and mixtures comprising at least one of the foregoing materials.

Referring now to FIGS. 4 and 5, the exemplary integration of an assembly of cell frame 52 and flow field support member 50 utilizing membrane support element 70 is shown. In the interest of clarity, the architecture of cell system 40 that defines the flow paths of the process water is not illustrated. Also, only the anode side of cell system 40 is shown. The integration of cell frame 52 with flow field support member 50 is effected by the insertion and mounting of membrane support element 70 into a channel 72 formed between cell frame 52 and flow field support member 50 and the fusing of membrane support element 70 with both cell frame 52 and flow field support member 50 to form a contiguous structure. An exemplary embodiment of membrane support element 70 is a gasket fabricated of a deformable material, e.g., a thermoset or a thermoplastic material, and configured such that opposing side surfaces 74a, 74b and an adjacently positioned bottom surface 76 are received by correspondingly configured and dimensioned surfaces of channel 72. It should be understood by those of skill in the art that although cell frame 52 and flow field support member 50 are shown to define channel 72 as having facing chamfered surfaces, any configuration of channel 72 capable of receiving a correspondingly configured membrane support element 70 may be incorporated into the design of the assembly of cell system 40.

Referring now specifically to FIG. 5, membrane support element 70 is shown disposed within the channel. Upon the engagement of the defining surfaces of membrane support element 70 with the corresponding receiving surfaces of the channel to form an interfacial surface between membrane support element 70 and the surfaces of the channel, heat or pressure may be applied to membrane support element 70. The application of such heat or pressure generally causes the material of which membrane support element 70 is fabricated to soften. When the regions of membrane support element 70 proximate the boundary surfaces approach the melt point of the material, the material along the interface flows into the structure of both flow field support member 50 and cell frame 52. Such flow allows for the filling of the void spaces along the boundaries of flow field support member 50 and cell frame 52 and causes the interface to become less distinct, thereby fusing membrane support element 70 with flow field support member 50 and cell frame 52. Such fusing results in the formation of a contiguous surface extending from the exposed surface of cell frame 52 across the exposed surface of membrane support element 70 to the exposed surface of flow field support member 50. The less distinct interface is loosely defined by gradual transitions, shown at 78, between membrane support element 70 and flow field support member 50 and cell frame 52. Gradual transitions 78 are substantially uniform in dimension from the boundary surface of membrane support element 70 and the boundary surfaces of the adjacent flow field support member 50 or cell frame 52.

The rate at which the material flows into the void spaces is a function of the melt point of the material of which membrane support element 70 is fabricated, the amount of heat transfer to the material, and the particular structure of the materials of fabrication of flow field support member 50 and cell frame 52. It should be noted that the material of which membrane support element 70 is fabricated is selected such that upon the application of heat, the material softens to allow it to flow while the material of which cell frame 52 is fabricated remains of sufficient rigidity to enable it to provide structural integrity to the frame assembly.

Upon removal of the heat, the material cools and hardens, thereby solidifying and forming a bond between membrane support element 70 and both flow field support member 50 and cell frame 52. The formation of the bond defines the cell frame/flow integration of the cell. Once the bond is formed, the components are fused together. Gradual transitions 78 provide sufficient support to membrane support element 70 to enable MEA 42 to be received thereon and withstand the pressures associated with operation of the cell into which membrane support element 70 is incorporated. Gradual transitions 78 further effectively eliminate the probability that gaps between flow field support member 50 and cell frame 52 will develop during operation of the cell, thereby enabling the pressure differential across the cell to be maintained.

Figure 6:
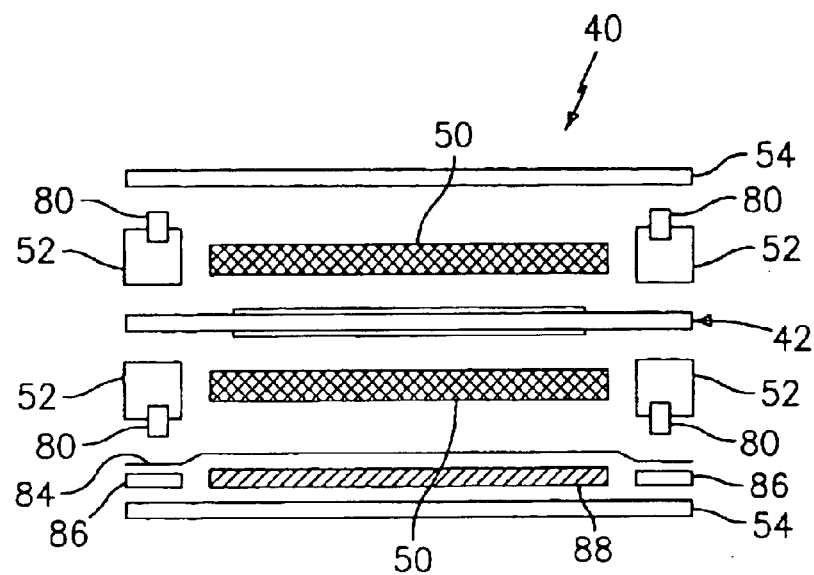
FIG. 6 is a schematic representation of an electrochemical cell incorporating resilient seals disposed at the frames thereof.

Referring now to FIG. 6, cell system 40 and an exemplary incorporation of sealing elements disposed intermediate frames 52 and cell plates 54 is shown. Again, cell 40 is typically one of a plurality of similar cells employed in a cell stack. The sealing elements comprise resilient seals 80 disposed at the surfaces of frames 52 to provide a seal between cell separator plates 54 and frames 52, thereby inhibiting fugitive emissions from the cell. A pressure pad 88 may optionally be disposed within cell system 40 at either the anode or the cathode side of the system. A gasket 86 may optionally be disposed between a pressure pad separator plate 84 and cell separator plate 54 on the anode side of the cell.

Figure 7:
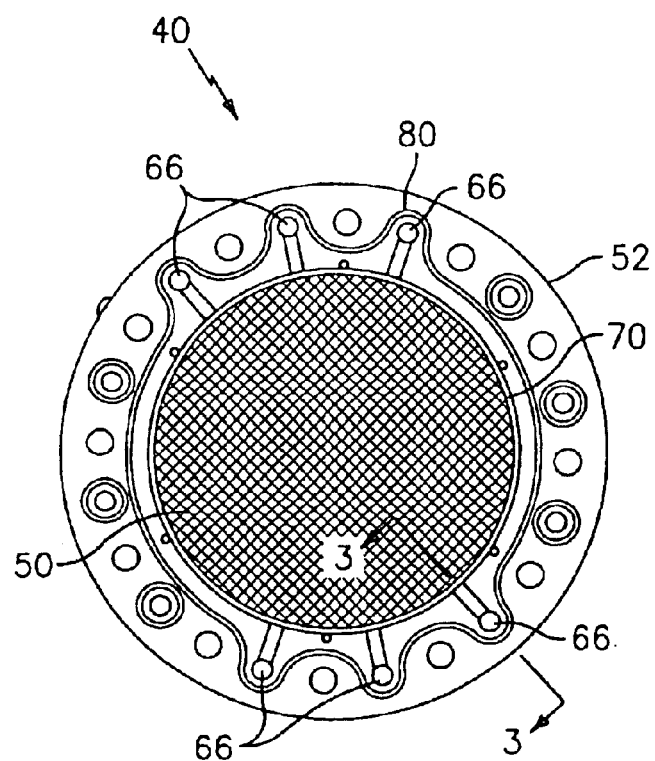
FIG. 7 is a plan view of an embodiment of a cell frame having a resilient seal disposed around a perimeter thereof and a membrane support element disposed at an adjacent surface.

Referring now to FIG. 7, a plan sectional view of cell system 40 is presented showing resilient seal 80 as it would be disposed on a surface of frame 52. Membrane support element 70 is also shown as a continuous element, e.g., a ring or the like, disposed at the interface of frame 52 and flow field support member 50. Resilient seal 80 comprises a flexible member that may be disposed in a groove (not shown) cut or otherwise disposed in the surface of frame 52 and that is engaged by the cell separator plate. Resilient seal 80 is preferably a compressible element capable of being positioned in the groove such that an upper portion thereof extends beyond the surface of frame 52. Resilient seal 80 is further configured such that upon being engaged by the cell separator plate and having a pressure applied thereto, resilient seal 80 deforms in directions orthogonal to the direction of the applied pressure, thereby providing a seal between the cell separator plate and frame 52. The seal effectively inhibits fluids from leaking from conduit 66 along the interface of the cell separator plate and frame 52 to the environment outside cell system 40.

Resilient seal 80 is typically formed of an elastomeric material, e.g., a material having a sufficient elasticity modulus such that resilient seal 80 retains its sealing capability upon cell system 40 experiencing pressures over a range from about zero pounds per square inch (psi) to at least the operating pressure of cell system 40. Materials utilized for resilient seal 80 are preferably dielectric in nature and compatible with the electrochemical cell environment. Such resilient seal materials are typically elastomeric and include ethylenepropylenediene monomer, polyetherimides (e.g., ULTEM®, commercially available from General Electric Company, Pittsfield, Mass.), polysulfone, VITON® (which is commercially available from GE plastics, Pittsfield, Mass.), or a similar material.

To simplify cell assembly, inhibit leakage due to movement of resilient seals 80 during operation of cell system 40, and to ensure that resilient seals 80 are disposed in locations most conducive to the optimum performance of cell system 40, resilient seals 80 are preferably fixedly attached to frames 52 or otherwise integrated into the surfaces of frames 52. Preferably, a groove is formed in frames 52 during the formation of the frame. In one exemplary formation process, frames 52 are molded and the groove is machined into each frame 52. In another exemplary formation process, frames 52 are molded with the groove therein. In either embodiment, the resilient seal material is then disposed into the groove. An integral seal/cell frame attachment can also be formed by molding resilient seal 80 directly into frame 52 (with or without a groove being first formed), disposing resilient seal 80 into a groove in frame 52 such that resilient seal 80 is frictionally retained in the groove, or disposing resilient seal 80 into a groove having a dove-tail cross-sectional geometry. Alternatively, resilient seal 80 can be disposed at frame 52 utilizing a gland sealing configuration, seal bonding, a bonding agent, or the like.

In order to maintain the sufficient pressure on the resilient seals and across the membrane and electrode assembly, the cell stack can be bound by end plates compressed between tie rods having creep compression springs. Alternatively, other pressure maintenance designs can be employed. For example, the pressurized fluid within the cell can be employed to impart the desired pressure across the cell by allowing the pressurized fluid in a cell manifold to equalize pressure with a pressure area disposed in an end-plate. In another example, the pressure of the cell can be monitored and the pressure within the pressurized area can be adjusted based upon the cell pressure using hydraulics or the like.

Referring now to all the FIGURES, the process by which cell system 40 embodying the anode feed electrolysis cell is operated is described. A cell stack is formed with the necessary clamping force to attain sealing and inhibit leakage. Process water is fed into each cell of cell system 40 on the side of the oxygen electrode (anode 46) to form oxygen gas, electrons, and hydrogen ions (protons). The reaction is facilitated by the positive terminal of a power source (not shown) electrically connected to anode 46 and the negative terminal of the power source connected to the hydrogen electrode (cathode 48). The oxygen gas and a portion of the process water exit the cell, while protons and water migrate across membrane 44 to cathode 48 where hydrogen gas is formed.

Membrane support element 70 disclosed herein can provide structural integrity to cell system 40 while resilient seals 80 disclosed herein can eliminate one or more non-resilient gaskets conventionally employed in electrochemical cell stacks. Both membrane support element 70 and resilient seals 80, when utilized alone or in combination with each other in the cell system, prevent or minimize the dislocation of cell components during assembly as well as operation of the cell and ensure the adequate sealing to prevent fluid leakage from the cell system when the cell system is pressurized. Resilient seals 80 are also able to accommodate cell stack creep without the employment of a separate creep compensating system. Furthermore, the sealing reliability and the operating pressure level are essentially independent of the initial cell-stack loading.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An electrochemical cell, comprising:
    an electrode;
    a proton exchange membrane disposed at the electrode;
    a flow field support member disposed at the electrode;
    a cell frame disposed at the flow field support member, and
    a membrane support element disposed intermediate the flow field support member and the cell frame, the membrane support element being integral with the flow field support member and the cell frame to define a contiguous surface extending from the flow field support member and the cell frame.

2. The electrochemical cell of claim 1, wherein a defining surface of the membrane support element is fused with defining surfaces of the flow field support member and the cell frame.

3. The electrochemical cell of claim 2, wherein the fusing of the membrane support element with defining surfaces of the flow field support member and the cell frame is effected with heat.

4. The electrochemical cell of claim 2, wherein the fusing of the membrane support element with defining surfaces of the flow field support member and the cell frame is effected with pressure.

5. The electrochemical cell of claim 1, wherein the membrane support element is a continuous element.

6. The electrochemical cell of claim 1, wherein the membrane support element is fabricated from a thermoset material, a thermoplastic material, or a combination of the foregoing materials.

7. The electrochemical cell of claim 1, further comprising a resilient seal disposed at the cell frame, the resilient seal being configured to engage the cell frame and to be engaged by surface.

8. The electrochemical cell of claim 7 wherein the resilient seal is disposed in a groove disposed at the cell frame.

9. An electrochemical cell, comprising:
    an electrode;
    a proton exchange membrane disposed at the electrode;
    a flow field support member disposed at the electrode;
    a cell frame disposed at the flow field support member; and
    a resilient seal disposed at the cell frame, the resilient seal being engageable by a surface to prevent fluid communication across the resilient seal.

10. The electrochemical cell of claim 9, wherein the resilient seal is disposed in a groove disposed at the cell frame.

11. The electrochemical cell of claim 9, wherein the resilient seal is fabricated from an elastomer.

12. The electrochemical cell of claim 11, wherein the elastomer is ethylenepropylenediene monomer, a polyetherimide, polysulfone, or a combination of the foregoing materials.

13. A method of integrating a frame with a flow field support member in an electrochemical cell, the method comprising:
    disposing a support member in a gap between the frame and the flow field support member; and
    melting the support member into the frame and the flow field support member to form a contiguous surface.

14. The method of claim 13, wherein the melting of the support member comprises heating an exposed surface of the support member.

15. The method of claim 13, wherein the melting of the support member comprises pressing an exposed surface of the support member.

16. A method of sealing a flow field of an electrochemical cell, the method comprising:
    disposing a resilient seal at a frame of the electrochemical cell; and
    disposing the resilient seal into a groove in the frame.

* * * * *